US012472506B2

(12) United States Patent
Pikhard et al.

(10) Patent No.: US 12,472,506 B2
(45) Date of Patent: Nov. 18, 2025

(54) JET MILL

(71) Applicant: BASF SE, Ludwigshafen am Rhein (DE)

(72) Inventors: Oliver Pikhard, Ludwigshafen (DE); Christian Riemann, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 100 days.

(21) Appl. No.: 18/037,618

(22) PCT Filed: Nov. 18, 2021

(86) PCT No.: PCT/EP2021/082208
§ 371 (c)(1),
(2) Date: May 18, 2023

(87) PCT Pub. No.: WO2022/106573
PCT Pub. Date: May 27, 2022

(65) Prior Publication Data

US 2023/0415165 A1 Dec. 28, 2023

(30) Foreign Application Priority Data

Nov. 20, 2020 (EP) ..................................... 20209095

(51) Int. Cl.
*B02C 19/00* (2006.01)
*B02C 19/06* (2006.01)

(52) U.S. Cl.
CPC .......... *B02C 19/0043* (2013.01); *B02C 19/06* (2013.01); *B02C 19/061* (2013.01); *B02C 2210/01* (2013.01)

(58) Field of Classification Search
CPC ..... B02C 19/06; B02C 19/061; B02C 19/066; B02C 19/0043; B02C 2210/01
See application file for complete search history.

(56) References Cited

U.S. PATENT DOCUMENTS 3,701,484 A 10/1972 Donovan
4,059,231 A * 11/1977 Neu ...................... B02C 19/066 241/5

(Continued)

FOREIGN PATENT DOCUMENTS

DE 509866 C 10/1930
EP 1955772 A2 8/2008

(Continued)

OTHER PUBLICATIONS

International Search Report and Written Opinion for Application No. PCT/EP2021/082208 mailed on Mar. 22, 2022, 8 pages.

(Continued)

*Primary Examiner* — Bobby Yeonjin Kim
(74) *Attorney, Agent, or Firm* — Lowenstein Sandler LLP

(57) ABSTRACT

The invention relates to a jet mill comprising a milling chamber with a longitudinal axis, an inlet at one end of the axis and an outlet at the opposite end of the axis, the milling chamber comprising a multitude of pins arranged in the free flow cross-section of the milling chamber, wherein the pins are arranged in at least two planes perpendicular to the longitudinal axis, the planes being distant to each other in the longitudinal direction, and the pins of one plane being laterally offset to the pins of the subsequent plane, wherein the milling chamber is divided into alternate pin segments and acceleration segments, the pin segments each having at least two planes of pins, and the acceleration segments having no pins.

13 Claims, 4 Drawing Sheets

(56) References Cited

U.S. PATENT DOCUMENTS

| | | | | |
|---|---|---|---|---|
| 5,765,766 | A * | 6/1998 | Yoshida | B02C 19/066 241/39 |
| 2004/0169098 | A1 | 9/2004 | Olson | |
| 2006/0163763 | A1 * | 7/2006 | Fellinger | E04F 21/12 264/129 |
| 2009/0236451 | A1 | 9/2009 | Nied | |
| 2009/0261187 | A1 | 10/2009 | Nied | |
| 2011/0049278 | A1 | 3/2011 | Ito | |
| 2014/0021275 | A1 | 1/2014 | Nied | |

FOREIGN PATENT DOCUMENTS

| | | | |
|---|---|---|---|
| EP | 3680018 | A1 | 7/2020 |
| JP | H01254266 | A | 10/1989 |
| JP | H07295294 | A | 11/1995 |
| WO | 2020210875 | A1 | 10/2020 |

OTHER PUBLICATIONS

Koeninger, et al., "Horizontal secondary gas injection in fluidized beds: Solid concentration and velocity in multiphase jets", Powder Technology, vol. 316, Jul. 1, 2017, pp. 49-58.

Koeninger, et al., "Dynamics of fine grinding in a fluidized bed opposed jet mill", Powder Technology, vol. 327, Mar. 2018, pp. 346-357.

European Search Report for EP Patent Application No. 20209095.7, Issued on May 19, 2021, 5 pages.

* cited by examiner

JET MILL

CROSS-REFERENCE TO RELATED APPLICATION(S)

The present application is a national phase entry under 35 U.S.C. § 371 of International Application No. PCT/EP2021/082208, filed on Nov. 18, 2021, which claims priority to European Patent (EP) application No. 20209095.7 filed on Nov. 20, 2020. The contents of these applications are hereby incorporated by reference herein in their entirety.

The invention relates to a jet mill comprising a milling chamber with a longitudinal axis, an inlet at one end of the axis and an outlet at the opposite end of the axis. The invention further relates to a process for milling solid particles comprising the steps of injecting the particles in a jet, and feeding the jet including the injected particles into a jet mill according to the invention.

BACKGROUND

A jet mill mills material by using a high-speed jet of compressed air, gas or steam to generate impacts between particles. No mechanical tools such as high-speed rotors are needed. The particles are crushed by the energy introduced by the milling gas. Compressed air is usually used as the milling gas, more rarely noble gases such as argon or nitrogen can be used for milling under inert conditions. The use of superheated steam is also possible and is used for special applications. The principle of jet milling is generally used wherever fine comminution is required. A jet mill mills dry materials to a fineness in the range of 0.1 to 200 micrometers for D90 value. The usual working range is in the area below 20 micrometers for D90 value. The most frequently used types of jet mills are opposed jet mills and spiral jet mills.

Opposed jet mills, also named fluidized bed opposed jet mills, comprise a milling bed, a transportation zone and an air classification zone. Particles to be milled are fed into the milling chamber and form a fluidized milling bed at the bottom of the jet mill. Gas jets are introduced into the milling bed via nozzles provided at the mill housing. The gas jets fluidize the milling bed by accelerating the particles lying at the bottom of the mill to high speeds. Along the gas jets as well as in the center of the milling bed the accelerated particles hit each other and are thereby milled to smaller particles. The gas loaded with particles rises upwards into the center of the milling chamber through the transportation zone and transports the particles upwards to an air classifier installed at the top of the mill. Typically, the classifier comprises a classifier wheel which is driven by a variable-speed motor. The air classifier separates the fine particles from the coarse particles. Particles that are too coarse are rejected by the classifier and fall back down into the fluidized bed. Fine particles leave the mill together with the milling gas and are separated from the milling gas in a suitable separator or dust filter.

Many different apparatuses and methods of operation have been developed over the recent years to improve the performance of opposed jet mills. As an example, the documents US 2009/0236451 A1, US 2009/0261187 A1 and US 2014/0021275 A1 disclose methods and jet mills apparatus for generating fine particles by means of a jet mill with an integrated dynamic air classifier.

Despite the fact that opposed jet mills represent a well-established technology for milling fine particles, some disadvantages come along with this technology. The performance of jet mills in terms of fineness strongly depends on the velocity of the gas jet. The maximum jet speed for air as milling gas is around 330 m/s which is the sonic speed of the gas. Using Laval nozzles, even supersonic speed can be achieved at the exit of the nozzles. However, recent studies showed that the factual jet speeds inside the mill are much lower. By particle image velocimetry measurements, it could be shown that the maximum particle velocity is just around 40 m/s (Koeninger et al., Powder Technology 316 (2017) 49-58). Furthermore, the kinetic energy transfer between particles in an opposed jet mill was measured and showed that the supplied energy transfer per stressing event is rather low (Koeninger et al., Powder Technology 327 (2018) 346-357). As the kinetic energy of a particle rises by square with the velocity, a particle with 300 m/s would have about 56 times the energy compared to a particle with 40 m/s. Another drawback is that the jet is only partially loaded with particles. The load of solids of the inner part of the jet is very low because most particles are accelerated at the outer circumference of the jet and do not manage to enter into the inner jet. Thus, a big part of the high kinetic energy is wasted. A further disadvantage of opposed jet mills is that the jets spread to the side when they collide in the middle of the milling chamber. Fine particles that are easier to accelerate can also follow the spreading jet more easily thus avoiding a frontal impact with each other. Bigger particles with higher moment of inertia can hit each other but only at low speed.

Spiral jet mills are broadly used in industry with mill sizes ranging from small laboratory units for product samples of only a few grams up to production machines for several tons throughput per hour. Spiral jet mills can also be divided into a milling, transportation and classification zone.

Compared to opposed jet mills the air classification is effected by a static eddy and not by a rotating wheel classifier. Another difference is that the jets are not opposed to each other but enter the mill tangentially. Several nozzles are arranged tangentially on the circumference of a typically round and flat grinding chamber. The flow of the grinding gas entering through the nozzles forms a spiral. The particles to be milled are fed into the milling chamber via an injector.

The working principle of this mill type is that particles to be milled are brought into a circular movement in the milling chamber and thus have to hit the entering gas jets. The particles are milled by mutual particle impacts.

Due to the rotational movement of the particles a centrifugal force is acting on the particles in the milling chamber. The gas introduced by the jets can leave the mill housing through a circular opening in the middle of the mill. Small particles can follow the gas stream and thus can be carried out of the mill. For bigger particles the relation between centrifugal force and radial drag force component is in favor of the centrifugal force, thus the bigger particles stay in the milling chamber until they are small enough to leave the mill. The fineness of the resulting milled particles can be influenced by the pressure of the jets and the specific load of the gas. Higher gas loads lead to a higher statistical probability for particle contacts. On the other hand, too high gas loads inhibit a proper function of the classification.

As for opposed jet mills many different apparatuses and methods of operation have been developed over the recent years to improve the performance of spiral jet mills. Examples are disclosed in the documents US 2004/0169098 A1 and US 2011/0049278 A1.

Even though spiral jet mills are broadly used in industry for a variety of applications, this technology has also some disadvantages. As for opposed jet mills, the performance of spiral jet mills in terms of fineness strongly depends on the velocity of the gas jet. Under normal operating conditions with air or nitrogen as operating gas the maximum jet speed is defined by the sonic speed of the gas, e.g. approximately 330 m/s for air or nitrogen. Laval nozzles can be used to generate supersonic gas speed, but only for limited distances. However, as for opposed jet mills a significant amount of energy of the jet is lost due to dissipation into the surrounding gas and expansion of the jet after leaving the nozzle.

A further disadvantage of both mill types is that the likeliness of two particles hitting each other is getting smaller by the size of the particles. Even for very highly loaded gas jets the likeliness of two particles hitting each other frontally is low. It is much more likely that they will hit each other tangentially thus using only part of the kinetic energy for milling.

Another problem is that the spectra of colliding intensities of jet mills known in the art is very broad due to the long residence times in the milling zone and the stochastic motions of the particles. This leads to an unnecessarily high number of particle impacts that absorb energy without leading to breakage of the particle.

Another problem is that the specific gas load for opposed jet mills and spiral jet mills are limited by the classification system. For milling purposes a high specific gas load would be advantageous to produce more collisions. For the air classification system too high gas loads lead to unprecise separations and thus lower product quality. Therefore, it is not possible to operate these mills in the optimum operating window for the mill.

The document U.S. Pat. No. 4,059,231 discloses an alternative construction of a jet mill. This jet mill includes an air-conveying system for carrying entrained particles of varying masses, a venturi for accelerating the air stream and entrained particles, a duct for receiving the accelerated air stream and particles, and impact bars mounted in the duct for selectively fragmenting the entrained particles. The impact bars are positioned in the accelerated air stream to establish adverse pressure fields which classify the entrained particles and which provide impact surfaces to fragment particles greater than a predetermined mass, the rest of the particles being deflected around the bars by the action of the adverse pressure fields.

Another problem is that with existing jet mills only a production of one milled product is possible. The classification systems applied are not able to classify into various fractions of precisely defined particle sizes.

SUMMARY OF THE INVENTION

It was an object of the invention to provide a jet mill that is characterized by a higher efficiency of the required energy input by the jet, a higher throughput and a narrower particle size distribution with the capability to generate even finer particles.

This task is solved according to the invention by a jet mill according to claim 1. Furthermore, the task is solved by a process for milling solid particles according to claim 12. Advantageous variants of the jet mill and the process are presented in claims 2 to 11 and 13.

A first subject of the invention is a jet mill comprising a milling chamber with a longitudinal axis, an inlet at one end of the axis and an outlet at the opposite end of the axis, wherein the milling chamber comprises a multitude of pins arranged in the free flow cross-section of the milling chamber. The pins are arranged in at least two planes perpendicular to the longitudinal axis, the planes being distant to each other in the longitudinal direction, and the pins of one plane being laterally offset to the pins of the subsequent plane. The milling chamber is divided into alternate pin segments and acceleration segments, the pin segments each having at least two planes of pins, and the acceleration segments having no pins.

The term "laterally offset" means that the center of the axis of a pin in one plane and the center of the axis of a pin in a subsequent plane lie on different lines parallel to the longitudinal axis of the mixing chamber.

A second subject of the invention is a process for milling solid particles comprising the steps of (a) injecting the particles in a jet, and (b) feeding the jet including the injected particles into a jet mill according to the invention.

DETAILED DESCRIPTION OF THE INVENTION

The jet mill according to the invention shows several advantages over jet mills known from the prior art:

The design of the milling chamber as a channel with a longitudinal axis avoids dead zones which would lead to a dissipation of energy introduced by the jet. Furthermore, the design avoids the free expansion of the jet fed to the mill which is common in known designs. Consequently, the jet mill according to the invention facilitates the utilization of a significantly larger part of the kinetic energy of the jet fed to the mill.

The pins installed inside the milling chamber have several advantageous functions. Their first function is to serve as obstacles for the jet. Particles in the jet are forced to collide with the pins with maximal velocity. This strongly rises the probability that a particle will be crushed on its first impact. Compared to existing mills the kinetic energy is raised by a factor of approximately 60. Depending on the substance used for the jet even higher values can be obtained, e.g. if dry steam is used for operation. Their second function is to act as nozzles. The cross section of the milling chamber is reduced by the pins. This leads to an acceleration of the jet and thus the particles to be milled. The third function of the pins is that their position forces the jet into a curved flow around the pins. The particles have to change their direction of flow along with the jet. Particles that are too coarse are not able to follow this change of direction due to their momentum of inertia and will therefore hit the next pin. Smaller particles however will follow the jet, reducing the likelihood of a collision of the respective particles with the subsequent pins. Thus, the design of the milling chamber enables a selective milling process in terms of particle size distribution. It also allows to adapt and optimize the position of the pins in a way that very fine milling is enabled, e.g. by reducing the distance between the pins and thus raising the curvature of the jet. The number of pins and the adjustable speed of the gas and particles allows to precisely adjust the impact force and the number of impacts in the mill. This allows the production of products with very precise particle size distributions. Another advantage of this mill is that there are no moving parts in direct contact with a solid loaded gas. Thus, the difficult sealing of moving parts that is often prone to wear is avoided. The simple design of the mill makes it easy to automatize cleaning of the mill. For an autonomous operation in a completely sealed room this is beneficial, e.g. for dust containment reasons in case of milling hazardous material.

In the acceleration segments without any pins the particles contained in the jet are accelerated compared to the pin segments. This leads to an increase of the impact energy of the particles hitting the surface of the pins in the subsequent pin segment. The overall efficacy of the mill is increased compared to mills that do not comprise intermediate acceleration segments.

The milling chamber may have any form suitable to be flown through by a jet loaded with solid particles. Length, width and height of the milling chamber can be chosen to meet the requirements of the milling task to be solved, e.g. in terms of throughput, available amount of milling gas volume flow, maximum allowable pressure drop or desired fineness of the milled particles.

The length of the milling chamber is preferably from 50 mm to 1000 mm, more preferably from 100 mm to 400 mm. Relevant parameters for the proper choice of the length of the milling chamber are the number of pins available and the maximum pressure drop in the chamber. If the milling chamber is too short, there is a lack of space to provide enough pins with a sufficient distance between the pins. Thus, the efficiency of the jet decreases. If the milling chamber is too long, the pressure drop will be too high, leading to a decrease of overall efficiency of the process.

In a preferred embodiment the cross-sectional area of the milling chamber perpendicular to the longitudinal axis has a rectangular form. The cross-sectional area may be constant or may vary over the length of the milling chamber. In one embodiment the cross-sectional area is constant over the length of the milling chamber. In another embodiment the cross-sectional area at the inlet of the milling chamber is smaller than at its outlet. In that case, the inlet of the milling chamber fulfills the function of a nozzle. In another embodiment the cross-sectional area at the outlet of the milling chamber is smaller than at its inlet. In that case, the jet is accelerated towards the outlet of the milling chamber. Depending on the type of classifier used to separate the particles a higher speed of the jet into the classifier can increase the efficiency of the classification process.

Preferably, the specific amount of the milling gas flow of the jet at the maximum cross-sectional area is from 25 to 450 $m^3/m^2/s$. Given a particular amount of the jet, the height and width of the milling chamber, and thus the cross-sectional area thereof, can be chosen accordingly.

In a preferred embodiment, the height of the milling chamber is from 3 mm to 10 mm, particularly from 5 mm to 6 mm.

The width of the milling chamber is preferably chosen depending on the amount of pressurized gas or steam to allow a jet of from 10 to 250 cubic meter of gas per hour and cm of chamber width ($m^3/h/cm$).

Preferably, at least the inner walls of the milling chamber are coated with or made of an abrasion resistant material, e.g. a ceramic material like silicon carbide or an abrasion resistant steel like Hardox (trademark of the company SSAB AB, Stockholm, Sweden). It is further preferred that the material is electroconductive to avoid an excess formation of electrostatic charges.

The pins may have any form that is suitable to cause a collision of the particles in a jet hitting the pins.

Preferably, the pins extend from one inner wall of the milling chamber to the opposite wall without any gap. It is further preferred that the pins are arranged perpendicularly to the direction of flow of the jet, e.g. by arranging the pins in a way that their axis is perpendicular to the axis of the milling chamber. Most preferably, the pins are arranged vertically such that they extend from the bottom of the milling chamber to its top.

The number of pins, their diameter and their distance to each other can be chosen to fulfill the requirements of the milling task. Generally, smaller pins force the jet and the particles therein into a smaller radius around the pin. Consequently, smaller pins will lead to finer particles. The pin diameter also influences the lifetime of the pin. As a general rule, a larger pin diameter leads to a longer lifetime. In a preferred embodiment the diameter of each pin is from 2 mm to 8 mm, more preferably from 3 mm to 5 mm. By this choice, safe process conditions, a fine product and a long lifetime of the pins can be achieved.

The distance between two neighboring pins in a plane is preferably chosen to be approximately in the same range as the diameter of the pins. This ensures that in a pin segment the particles are led from a first plane of pins to a second plane of pins, and that blockages of the flow channels are avoided. More preferably, the ratio of the distance between two neighboring pins and the diameter of the respective pins is from 0.8 to 1.5. In this context, “diameter” means the lateral diameter, i.e. the extension of the pin in lateral direction which is the direction of the plane.

The distance between two planes is preferably defined via the envelope of the pins in the respective planes. The envelope of a plane is a line or a curve tangential to the outermost surface of the pins in that plane. The distance between two planes is then defined as the shortest line connecting the envelopes of the neighboring planes. It is preferred that the ratio of the distance between two neighboring planes and the diameter of the pins in the respective planes is from 0.8 to 1.5. In this context, “diameter” means the axial diameter, i.e. the extension of the pin in the direction of the longitudinal axis of the milling chamber.

In one preferred embodiment the pins of two neighboring planes are arranged such that in the lateral direction, i.e. perpendicularly to the longitudinal axis, the pins of a subsequent plane are arranged in the free passageway between two pins of the preceding plane, particularly in the middle of the free passageway. More preferably, the ratio of the distance between two neighboring pins in a plane and the lateral diameter of the respective pins is from 0.8 to 1.5, and the ratio of the distance between two neighboring planes in terms of their envelopes and the axial diameter of the pins in the respective planes is from 0.8 to 1.5. This configuration of pins forces the jet and the particles contained therein into a bended wavelike movement around the pins, increasing the probability that the particles hit the pins of the subsequent planes.

In another preferred embodiment the pins of three neighboring planes are arranged such that the pins of the third plane are laterally offset to the pins of the second plane and to the pins of the first plane. In the lateral direction, the pins of the second plane are arranged in the free passageway between two pins of the first plane, particularly in the middle of the free passageway. More preferably, the ratio of the distance between two neighboring pins in the first or second plane and the lateral diameter of the respective pins is from 0.8 to 1.5, and the ratio of the distance between the first and the second plane in terms of their envelopes and the axial diameter of the pins in the respective planes is from 0.8 to 1.5. The pins in the third plane are arranged such that the pin-to-pin distance between a pin in the second plane and a pin in the third plane has an axial and a lateral component. More preferably, the ratio of the lateral component of the pin-to-pin distance and the lateral diameter of the respective pin in the third plane is from 0.8 to 1.5, and the ratio of the axial component of the pin-to-pin distance and the lateral component of the pin-to-pin distance is from 0 to 2. This configuration of pins forces the jet and the particles contained therein into a bended wavelike movement around the pins, increasing the probability that the particles hit the pins of the subsequent planes. Furthermore, this configuration offers a flexibility to adjust the pressure drop in the milling chamber in a wide range.

In a preferred embodiment the surface of the pins facing the inlet is convex. In this context, "surface" is to be understood as the area of the pins that is hit by a jet entering through the inlet. The term "convex" is to be understood in its mathematical definition: The surface of the pins is convex if the straight line between arbitrary points of this surface runs completely within the pin. Examples of pins with convex surfaces are those with a circular, elliptic or wing-shaped cross section. The form of the pins can be selected according to process and manufacturing needs. A pin with a circular or elliptic cross section for example is typically easy to produce, whereas a wing-shaped cross section may be more complex to produce. With respect to process performance, a wing-shaped cross section may be the better choice if pressure drop over the mill is an issue.

In a preferred embodiment the pins are removably attached inside the milling chamber. In one embodiment the pins have a length that is larger than that part of the pin inside the milling chamber, and the pins are introduced into the milling chamber through openings sealed against the environment. Depending on the wear of the pins inside the milling chamber the pins can be pushed further into the milling chamber such that a fresh part of the pin replaces the worn part. This embodiment is advantageous in view of the high wear that the pins may be subject to, depending on the material of the pin and the substances to be milled, as it allows a longtime operation without the need to shut down operation of the mill.

In many applications the pins will be subject to abrasion such that there is a need to replace some or all of the pins from time to time. In a preferred embodiment at least some of the pins comprise a sensor capable of detecting a measure for abrasion of the respective pin. In a first variant of this embodiment the sensor is an acceleration sensor capable of detecting wear due to the velocity of the particles hitting the pins. An example of such a sensor is a Piezoelectric sensor. In a second variant of this embodiment the sensor comprises means to excite the pins with a vibrating sweep signal and means to capture the frequency response of the pins in order to calculate abrasion or wear. In a third variant of this embodiment the sensor is capable of measuring conductivity of the pins. In one example, the respective pins are made from a material that is non-conductive, e.g. a ceramic material, and contain a conductive wire, e.g. a metallic wire, inside the pin. As soon as the pin is worn down to the wire, the wire breaks and the sensor will detect an abrupt change in conductivity. A jet mill according to this embodiment may contain a single type of sensors or a mix of sensor types. The provision of sensors in at least some of the pins in the mill enables condition monitoring and predictive maintenance of the mill and thus savings in operating costs.

In a preferred embodiment the pin segments have two to five planes of pins each.

It is further preferred that the length of the acceleration segments is larger than the longitudinal distance between planes in the pin segments. The advantage of this embodiment is that the particles can reach higher velocities and thus a higher impact energy in the acceleration segment.

The distance between two neighboring pin segments and thus the length of the acceleration segment between these pin segments is preferably chosen from 20 to 200 mm. This range has turned out to provide a large operating window to achieve high particle speed in a mill with a reasonable length.

The number of pin segments is preferably chosen from 1 to 10, more preferably from 2 to 5. This range has turned out to be a good compromise between the particle speed, impact per particle and pressure drop along the milling chamber. The higher the desired impact force is, the lower the number of pin segments should be chosen.

In a preferred embodiment an acceleration chamber with an inlet and an outlet is connected to the milling chamber, the outlet of the acceleration chamber being the inlet of the milling chamber. The provision of an acceleration chamber at the entrance of the mill enables an increase of the impact energy of the particles hitting the surface of the pins in the first pin segment. It is further preferred that the acceleration chamber has a cone-shaped form.

For this embodiment with an acceleration chamber at the inlet it is further preferred that the inlet of the acceleration chamber has a smaller cross-sectional area than its outlet. In one variant, the ratio of the width of the inlet of the milling chamber and the width of the inlet of the acceleration chamber is preferably from 1 to 7. The ratio of the length of the acceleration chamber and the width of inlet of the milling chamber is preferably from 2 to 10.

In a further variant, the cross-sectional areas of the inlet and the outlet of the acceleration chamber are different in size and/or form. It is particularly preferred that the inlet of the acceleration chamber has a circular form and the outlet of the acceleration chamber has a rectangular form. This variant is especially suited to connect a pipe to the inlet of the acceleration chamber, e.g. a pipe through which pressurized air is fed to the mill. An injector for the particles to be milled may be connected to such a pipe or directly to the acceleration chamber.

In a preferred embodiment the pins are made from a material selected from the group of wear resistant steel or wear resistant ceramics, in particular from the group of wear resistant steel, corundum, silicon carbide, tungsten carbide.

In a preferred embodiment the height of the milling chamber is from 3 mm to 10 mm, particularly from 5 mm to 6 mm. This range has turned out to be a good compromise between milling capacity and separation efficiency in a subsequent classifier.

The jet mill according to the invention can be used as a stand-alone apparatus or in combination with other apparatuses or components, for example with a classifier. In a preferred embodiment the outlet of the milling chamber is coupled to the inlet of a classifier capable of separating fine particles from coarse particles. It is further preferred that the classifier is capable of separating several product fractions simultaneously with at least one fine particle fraction and at least one coarse particle fraction. The coupling of the outlet of the milling chamber to the inlet of a classifier may be direct or indirect, e.g. by means of a tube or a hose.

It is particularly preferred that the classifier is based on the Coanda effect. This facilitates the generation of very fine particles and several product fractions at the same time. Another advantage of this mill and classifier combination is that there are no moving parts in direct contact with a solid loaded gas.

Some embodiments of the inventive jet mill are especially advantageous when a classifier, in particular a Coanda classifier, is coupled to the outlet of the mill.

In a preferred embodiment the last section of the mill is used to finally accelerate the particles to a speed similar to the milling gas. The advantage is that particles with similar velocity as the milling gas lead to better classifying results in a Coanda classifier.

In a preferred embodiment the cross section of the last section of the mill is reduced in order to raise the gas velocity before it enters into the Coanda classifier. The advantage is that the higher the gas and particle velocities are the finer the cut size in a Coanda classifier will be.

In another preferred embodiment the cross section of the last section of the mill is widened in a de Laval nozzle type shape. This also increases the gas velocity towards the end of the mill before entering the classifier.

Provisions to accelerate the gas velocity towards the entry into the classifier are especially advantageous for very fine separations with particle sizes in the micron to submicron range.

In a preferred embodiment of the coupled system the outlet for the coarse fraction is recycled to the inlet of the milling chamber or to the inlet of the acceleration chamber.

In another preferred embodiment of the coupled system the fresh particles to be milled are fed into the recycle stream from the outlet for the coarse fraction to the inlet of the milling chamber or to the inlet of the acceleration chamber.

In a preferred embodiment the feed material of the mill and the recycled coarse fraction of the Coanda classifier are fed via the same injector system. To do so the fresh feed material of the mill can be fed with a device that decouples ambient air pressure a potential vacuum in the injector system, e.g. by using airtight rotary cell valves or screw conveyors. The coarse fraction from the Coanda classifier is preferably separated from the classifying gas stream, e.g. via a cyclone and a rotary cell valve. The transport back to the injector system can be realized for example via pneumatic transport by the suction air of the pneumatic injector or via solids transportation systems such as conveyor belts or screw conveyor.

In a preferred embodiment of the process for milling and classifying solid particles, wherein the outlet of the milling chamber is recycled to the inlet of a classifier capable of separating fine particles from coarse particles, the process comprises the steps of (a) injecting the particles in a jet, (b) feeding the jet including the injected particles into a jet mill according to the invention, and (c) separating at least one fine particle fraction from the classifier feed material.

All preferred embodiments of the jet mill and of the coupled system are also preferred embodiments of the process for milling and classifying solid particles in a jet mill or in a coupled system according to the invention.

For all embodiments the jet is preferably a high-speed stream of a gas or a dry steam. For particle sizes of the milled particles of about or less than one micrometer, dry steam is particularly preferred.

The jet mill according to the invention can advantageously be used to mill a multitude of types of particles, for example magnetic materials, battery materials, active ingredients such as ibuprofen, citric acid or magnesium carbonate, pigments, e.g. for paints, metal organic frameworks, carbonyl iron powder.

The invention is explained in more detail below with reference to the drawings. The drawings are to be interpreted as in-principle presentation. They do not constitute any restriction of the invention, for example with regards to specific dimensions or design variants. In the figures.

LIST OF REFERENCE NUMERALS USED

Figure 1:
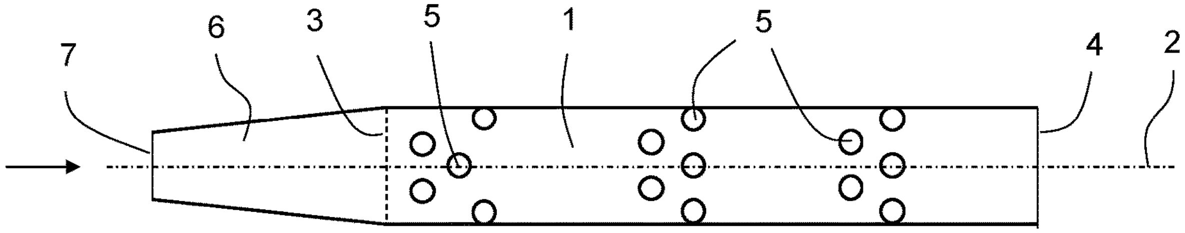
FIG. 1 shows a longitudinal top view of a first embodiment of a jet mill according to the invention.

1 . . . milling chamber
2 . . . longitudinal axis
3 . . . inlet of the milling chamber
4 . . . outlet of the milling chamber
5 . . . pin
6 . . . acceleration chamber
7 . . . inlet of the acceleration chamber
11 . . . gas supply
12 . . . additional gas
13 . . . additional gas
14 . . . fine particles outlet
15 . . . medium particles outlet
16 . . . coarse particles outlet
17 . . . particle feed
18 . . . separation unit
19 . . . off gas
A1, A2 . . . axial distance
L1, L2 . . . lateral distance
P1, P2, P3, P4 . . . planes of pins FIG. 1 shows a longitudinal cut-away top view into a jet mill as a first embodiment according to the invention. The jet mill comprises a milling chamber 1 with a longitudinal axis 2, an inlet 3 at one end of the axis and an outlet 4 at the opposite end of the axis. Inside the milling chamber 1 there are fifteen pins 5 arranged in three pin segments with five pins 5 each. Between the pin segments there is one acceleration segment each with no pins. Counting from the inlet 3 to the outlet 4, the first pin segment comprises three planes of pins. In the first plane, two pins 5 are symmetrically arranged with respect to the longitudinal axis 2. The second plane comprises one pin 5 which is arranged in the center of the milling chamber on the longitudinal axis 2. The third plane comprises two pins 5 attached to the left wall and the right wall of the milling chamber 1 respectively. The second pin segment comprises two planes of pins 5. The arrangement of pins in the first plane of the second pin segment is identical to that of the first plane in the first pin segment. The second plane of the second pin segment comprises three pins 5. One pin is arranged in the center of the milling chamber on the longitudinal axis 2. The two other pins are attached to the left wall and the right wall of the milling chamber respectively. The arrangement of pins in the third pin segment is identical to that of the second pin segment. All planes are distant to each other in the longitudinal direction. The pins of one plane are laterally offset to the pins of the adjacent planes in that the center of the axis of a pin in one plane and the center of the axis of a pin in a subsequent plane lie on different lines parallel to the longitudinal axis of the mixing chamber.

An acceleration chamber 6 with an inlet 7 and an outlet is connected to the milling chamber 1, the outlet of the acceleration chamber being the inlet 3 of the milling chamber. The cross-sectional areas of the milling chamber 1 and the acceleration chamber 6 are rectangular with the cross-sectional area of the inlet 7 of the acceleration chamber being smaller than its outlet.

All pins 5 of this example have the same cylindrical form. Their cross-section is circular, thus the surface of the pins facing the inlet 3 is convex.

Figure 2:
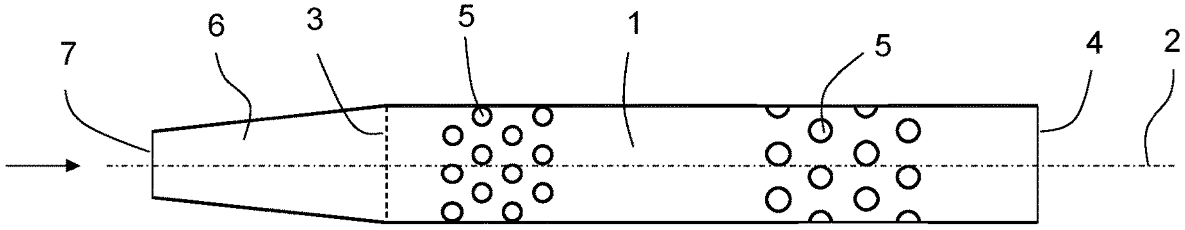
FIG. 2 shows a longitudinal top view of a second embodiment of a jet mill according to the invention.

FIG. 2 shows a longitudinal cut-away top view into a jet mill as a second embodiment according to the invention. The jet mill comprises a milling chamber 1 with a longitudinal axis 2, an inlet 3 at one end of the axis and an outlet 4 at the opposite end of the axis. Inside the milling chamber 1 there are twenty-four pins 5 arranged in two pin segments with twelve pins 5 in four planes each. Between the pin segments there is an acceleration segment with no pins. Counting from the inlet 3 to the outlet 4, the first plane of the first pin segment comprises three pins. One pin is attached to the right wall of the milling chamber whereas the other two pins are arranged with an equal lateral distance between the pins. The lateral distance of the left-most pin to the left wall is identical to the lateral distance between the pins in that plane. The pins in the second plane of the first pin segment are arranged in a similar manner as the pins in the first plane but are laterally offset to the pins of the first plane. The left-most pin is attached to the left wall of the milling chamber whereas the other two pins are arranged with an equal lateral distance between the pins. The lateral distance of the right-most pin to the right wall is identical to the lateral distance between the pins in that plane. The pins of the third plane are arranged like the pins in the first plane, and the pins of the fourth plane are arranged like the pins of the second plane. All pins in the first pin segment have the same cylindrical form. Their cross-section is circular, thus the surface of the pins facing the inlet 3 is convex.

The pins of the second pin segment are larger in diameter than the pins of the first pin segment. Counting from the inlet 3 to the outlet 4, the first plane of the second pin segment comprises three pins. One pin is attached to the left wall of the milling chamber whereas the other two pins are arranged with an equal lateral distance between the pins. The cross-section of the left-most pin is half-circular whereas the cross-section of the other two pins is circular. The lateral distance of the right-most pin to the right wall is identical to the lateral extension of the left-most pin attached to the wall. The pins in the second plane of the second pin segment are arranged in a similar manner as the pins in the first plane but are laterally offset to the pins of the first plane. The right-most pin is attached to the right wall of the milling chamber whereas the other two pins are arranged with an equal lateral distance between the pins. The cross-section of the right-most pin is half-circular whereas the cross-section of the other two pins is circular. The lateral distance of the left-most pin to the left wall is identical to the lateral extension of the right-most pin attached to the wall. The pins of the third plane are arranged like the pins in the first plane, and the pins of the fourth plane are arranged like the pins of the second plane. The cross-section of all pins in the second pin segment is circular or half-circular, thus the surface of the pins facing the inlet 3 is convex.

All planes are distant to each other in the longitudinal direction. The pins of one plane are laterally offset to the pins of the adjacent planes.

An acceleration chamber 6 with an inlet 7 and an outlet is connected to the milling chamber 1, the outlet of the acceleration chamber being the inlet 3 of the milling chamber. The cross-sectional areas of the milling chamber 1 and the acceleration chamber 6 are rectangular with the cross-sectional area of the inlet 7 of the acceleration chamber being smaller than its outlet.

Figure 3:
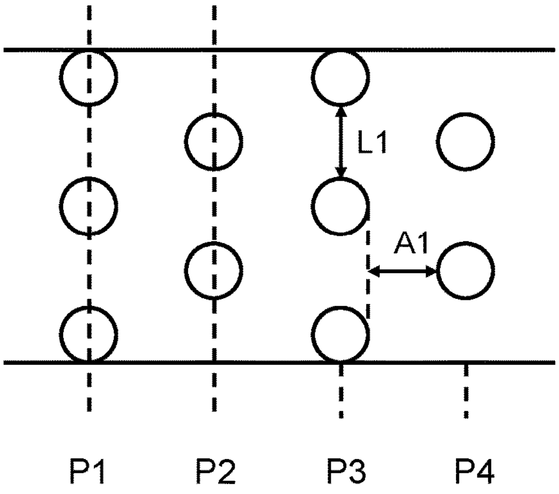
FIG. 3 shows a top view of a segment of a milling chamber with four planes of pins.

FIG. 3 shows a longitudinal cut-away top view of a pin segment of a milling chamber as a further exemplary embodiment according to the invention. The pin segment comprises four planes of pins. Counting from left to right in the direction of the jet, the first plane P1 and the third plane P3 comprise three pins each. One pin is attached to the right wall of the milling chamber, one pin is attached to the left wall of the milling chamber, and one pin is arranged in the lateral center of the milling chamber on the longitudinal axis (the axis not being shown in FIG. 3). The second plane P2 and the fourth plane P4 comprise two pins each which are arranged symmetrically to the longitudinal axis between this axis and the channel walls. All pins in this segment have the same cylindrical form with a circular cross-section.

In the lateral direction, i.e. perpendicularly to the longitudinal axis, the pins of a subsequent plane are arranged in the middle of the free passageway between two pins of the preceding plane. The ratio of the lateral distance L1 between two neighboring pins in a plane and the diameter of the respective pins is preferably from 0.8 to 1.5. In the example shown in FIG. 3 this ratio is 1.25.

The axial distance A1 between two neighboring planes is defined via the envelope of the pins in the respective planes. In the example shown in FIG. 3 the envelope of a plane is a line tangential to the outermost surface of the pins in that plane, as indicated by the dashed line in plane P3. It is preferred that the ratio of the axial distance A1 between two neighboring planes and the diameter of the pins in the respective planes is from 0.8 to 1.5. In the example shown in FIG. 3 this ratio is 1.15.

Figure 4:
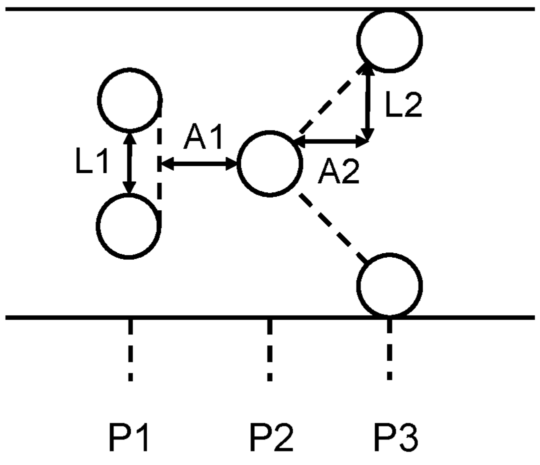
FIG. 4 shows a top view of a segment of a milling chamber with three planes of pins.

FIG. 4 shows a longitudinal cut-away top view of a pin segment of a milling chamber as a further exemplary embodiment according to the invention. The pin segment comprises three planes of pins. Counting from left to right in the direction of the jet, the first plane P1 comprises two pins that are arranged to the left and to the right of the longitudinal axis of the milling chamber (the axis not being shown in FIG. 4). The second plane P2 comprises one pin that is arranged in the center of the milling chamber on the longitudinal axis. The third plane P3 comprises two pins that are attached to the left wall and to the right wall of the milling chamber. All pins in this segment have the same cylindrical form with a circular cross-section.

The pins of the third plane P3 are laterally offset to the pins of the second plane P2 and to the pins of the first plane P1. In the lateral direction, the pin of plane P2 is arranged in the middle of the free passageway between the two pins of plane P1.

The ratio of the lateral distance L1 between the two pins in plane P1 and the diameter of the respective pins is preferably from 0.8 to 1.5. In the example shown in FIG. 4 this ratio is 0.95. The axial distance A1 between plane P1 and plane P2 is defined via the envelope of the pins in the respective planes. In the example shown in FIG. 4 the envelope of a plane is a line tangential to the outermost surface of the pins in that plane, as indicated by the dashed line in plane P1. It is preferred that the ratio of the axial distance A1 between the envelopes of the first plane P1 and the second plane P2 and the axial diameter of the pins in the respective planes is from 0.8 to 1.5. In the example shown in FIG. 4 this ratio is 1.2.

The pins in the third plane P3 are arranged such that the shortest distance between a pin in the second plane P2 and a neighboring pin in the third plane P3 has an axial component A2 and a lateral component L2. It is preferred that the ratio of the lateral component L2 of the pin-to-pin distance and the lateral diameter of the respective pin in the third plane P3 is from 0.8 to 1.5.In the example shown in FIG. 4 this ratio is 1.25. It is further preferred that the ratio of the axial component A2 of the pin-to-pin distance and the lateral component L2 of the pin-to-pin distance is from 0 to 2. In the example shown in FIG. 4 this ratio is 1.

Figure 5:
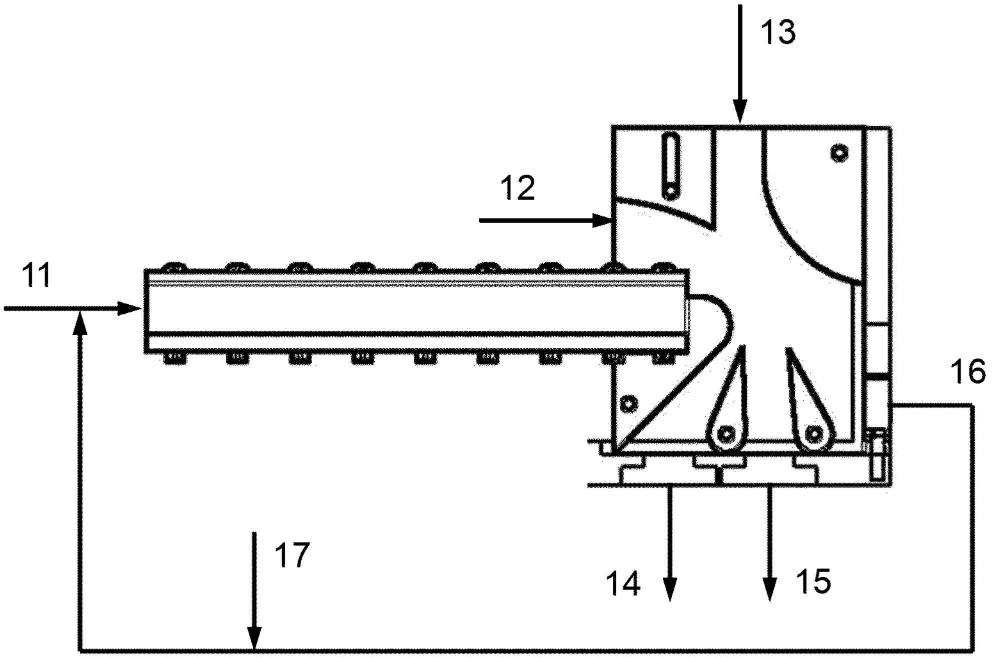
FIG. 5 shows a schematic view of a first embodiment of a jet mill coupled to a Coanda classifier.

FIG. 5 shows a schematic view of a first embodiment of a jet mill coupled to a Coanda classifier. Particles to be milled are fed into a gaseous medium and are injected into the inlet of the jet mill in a gas supply 11. The outlet of the jet mill is directly coupled to the inlet of the Coanda classifier. Coanda classifiers are known in the art (for example: Heinrich Schubert (Ed.): Handbuch der Mechanischen Verfahrenstechnik, chapter 7, page 608, Wiley-VCH Verlag GmbH & Co. KGaA, 2012).

In the example shown the Coanda classifier is able to separate the milled particles into three fractions, a fine particle fraction, a medium particle fraction and a coarse particle fraction. Additional gas streams 12 and 13 without particle load are available to influence the separation into the three fractions. The fine particle fraction is removed from the classifier via a fine particle outlet 14. The medium particle fraction is removed from the classifier via a medium particle outlet 15. The coarse particle fraction is removed from the classifier via a coarse particle outlet 16 and is recycled to the gas supply 11 and thus the inlet of the milling chamber of the jet mill. Fresh particles to be milled can be fed into the gas supply 11 directly and/or into the recycle stream from the coarse particle outlet 16 back to the gas supply 11. This option is shown in FIG. 5 in stream 17.

Figure 6:
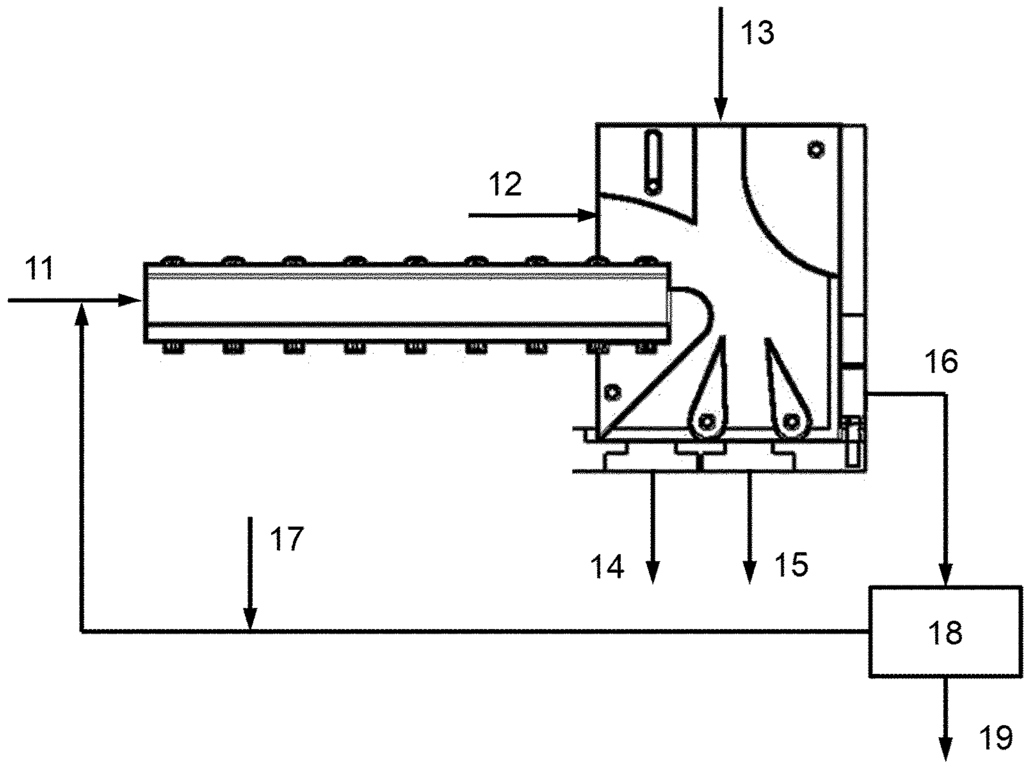
FIG. 6 shows a schematic view of a second embodiment of a jet mill coupled to a Coanda classifier.

FIG. 6 shows a schematic view of a second embodiment of a jet mill coupled to a Coanda classifier. The difference between the first embodiment shown in FIG. 5 and the second embodiment shown in FIG. 6 is that the coarse particles removed from the classifier are fed to a further separation unit 18 before they are recycled to the inlet of the jet mill. The separation unit 18 may contain any suitable separation means, in particular a filter, a cyclone or a combination of a filter and a cyclone. The coarse solids fraction separated in the separation unit is preferably hermetically separated from the gas stream, e.g. via a rotary cell valve or similar devices such as screw conveyors. By these means a decoupling between the underpressure of the injector of the gas supply 11 and the underpressure in the Coanda classifier can be realized. This is beneficial to individually adjust the feed rate of the mill and the separating conditions in the Coanda classifier. A cleaned off gas 19 is withdrawn from the separation unit 18.

EXAMPLES

A jet mill according to the invention was compared with an opposed jet mill and a spiral jet mill according to the prior art. A limestone powder ("Juraperle 150-300" by company Omya Gmbh, Köln, Germany) was milled in each of the three mills. The grain size parameters of the powder were as follows:

| | |
|---|---|
| D10 [μm] | 4.6 |
| D50 [μm] | 119.0 |
| D90 [μm] | 225.0 |

In each case the milling pressure for the respective mill was set as high as possible as this leads to the highest product fineness. All mills were then loaded until the particle size distribution of the milled product became significantly coarser or the mill reached a critical operating state.

Comparative Example 1

As comparative example 1 an opposed jet mill (type AFG 100 by company Hosokawa Alpine AG, Augsburg, Germany) was used. The mill was operated with three nozzles with a diameter 10 of 1.9 mm each to supply the milling gas with a pressure of 7 bar. The material was fed into the milling chamber with a screw feeder at a feed rate of 4 kg/h. The diameter of the deflecting wheel classifier in the mill was 50 mm. The air classifier was operated at 12,500 rpm resulting in a circumferential speed of 33 m/s.

Comparative Example 2

As comparative example 2 a spiral jet mill with a diameter of the milling chamber of 170 mm and a milling chamber height of 15 mm was used. The spiral jet mill was equipped with ten cylindrical milling gas nozzles with a diameter of 1.5 mm each, equally distributed over the circumference of the milling chamber. The milling gas pressure was 3.6 bar. The diameter of the injector nozzle was 2.5 mm and the diameter of the booster nozzle was 8 mm. The injector nozzle pressure was 3.8 bar. The vortex finder of the mill had a circular shape with a diameter of 40 mm.

Example 1 According to the Invention

A jet mill similar to the embodiment shown in FIG. 1 was used as example according to the invention. The jet mill comprised a milling chamber with a longitudinal axis, an inlet at one end of the axis and an outlet at the opposite end of the axis. In the free flow cross-section inside the milling chamber there were fifteen pins arranged in three pin segments with five pins each. Each pin segment comprised two planes of pins, the planes being perpendicular to the longitudinal axis. Counting from the inlet to the outlet, in the first plane two pins were symmetrically arranged with respect to the longitudinal axis. The second plane comprised three pins. One pin was arranged in the center of the milling chamber on the longitudinal axis. The two other pins were attached to the left wall and the right wall of the milling chamber respectively. All planes were distant to each other. The distance in the longitudinal direction between the first planes and the respective second planes in each pin segment was 10 mm. The pins of one plane are laterally offset to the pins of the adjacent planes in that the center of the axis of a pin in one plane and the center of the axis of a pin in a subsequent plane lie on different lines parallel to the longitudinal axis of the mixing chamber. The pins were made of silicon carbide. All pins had the same cylindrical form. Their cross-section was circular with a diameter of 4 mm, thus the surface of the pins facing the inlet was convex. The distance in the longitudinal direction between the first planes and the respective second planes in each pin segment in terms of their envelopes was thus 6 mm. Between the pin segments there was one acceleration segment each with no pins. The length of both acceleration segments was 36 mm each.

An acceleration chamber with an inlet and an outlet was connected to the milling chamber, the outlet of the acceleration chamber being the inlet of the milling chamber. The length of the acceleration chamber was 50 mm. The length of the milling chamber was 165 mm. The cross-sectional areas of the milling chamber and the acceleration chamber were rectangular. The width of the milling chamber was 20 mm and its height 5 mm. The width of the inlet of the acceleration chamber was 9 mm.

The outlet of the milling chamber was coupled to the inlet of a classifier based on the Coanda effect. The overall setup is schematically shown in FIG. 6.

A screw conveyor was used to feed the feed material into the suction pipe of the injector. In the injector the solid feed material was dispersed in the milling gas jet. The dispersed material was accelerated in the acceleration chamber in a way that the particles reached a velocity similar to the milling gas velocity. Subsequently the particles hit the pins of the first pin segment and were crushed by the mechanical impact. Additionally, particle-particle contacts between particles reflected by the pin and particles dispersed in the milling gas led to high energy impacts and thus particle breakages. After the first pin segment the particles were re-accelerated until they hit the first pins of the second pin segment. After the third pin segment the particles were re-accelerated by the remaining milling gas pressure so that they could enter into the Coanda classifier at a speed similar to the milling gas. The main part of the milling gas entering into the Coanda classifier was forced into a bend motion along the bend shape of the Coanda inlet. Fine particles of a high specific surface followed the bend motion of the gas stream. Particles of a lower specific surface, e.g. medium sized or coarse particles, could only partially follow the motion of the bend gas and were less deviated from their initial straight motion. Thus, a parabolic distribution of fine to coarse particles could be realized inside the housing of the Coanda classifier. By adjusting the splitters in the paths of the particles of different size a split into a fine particle fraction and a coarse particle fraction was possible. To optimize the flight path of the particles in the Coanda classifier and thus to optimize the separation performance additional gas was sucked into the Coanda classifier. The split off fine particles were sucked into a filter to remove the solid phase from the gas phase. The coarse particles were sucked into a cyclone to remove the solid phase from the gas phase. The coarse particle fraction collected at the bottom of the cyclone was carried out of the cyclone by a screw conveyor and subsequently fed back into the suction pipe of the injector. Thus, the coarse particles were mixed with the fresh material and were re-fed to the mill.

Parameters and results of the milling experiments are shown in the following table:

| | Comp. Ex. 1 | Comp. Ex. 2 | Inv. Ex. |
|---|---|---|---|
| Feed rate [kg/h] | 4 | 2 | 10 |
| Milling pressure [bar] | 7 | 3.6 | 7.8 |
| Volume flow [$Nm^3/h$] | 62 | 86.6 | 36 |
| Specific load [$g/m^3$] | 65 | 23 | 278 |
| Specific energy [kWh/kg] | 1.12 | 1.86 | 0.28 |
| D10 [μm] | 0.4 | 0.6 | 0.3 |
| D50 [μm] | 3.0 | 3.7 | 3.0 |
| D90 [μm] | 5.7 | 9.7 | 6.5 |

As can be seen from the above table the product fineness as a result of milling the powder in the jet mill according to the invention is very similar to the product fineness achieved with the opposed jet mill. The product of the milling process in the spiral jet mill is coarser.

Due to its design, the jet mill according to the invention can be operated at a significantly higher specific load of particles in the milling gas (jet). Due to the high solids loading of the milling gas and the comparatively low volumetric flow, the specific energy consumption of the milling process according to the invention is much lower than those of the processes according to the prior art. In the examples above the specific energy consumption is lower by a factor of 4 compared to the opposed jet mill and by a factor of 6.6 compared to the spiral jet mill.

Comparative Example 3

In a further set of experiments the influence of the intermediate acceleration segments was investigated. The material to be milled was the same limestone powder ("Juraperle 150-300" by company Omya Gmbh, Köln, Germany) as in the previous examples. In each case the milling pressure for the respective mill was set to 8 bars (abs) and the feed rate of the limestone particles was set to 18 kg/h.

Figure 7:
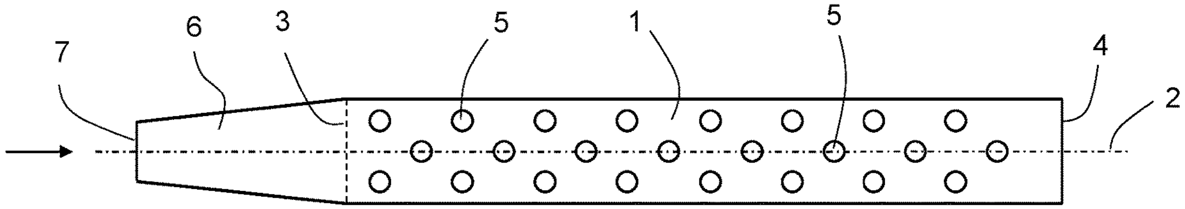
FIG. 7 shows a longitudinal top view of a jet mill according to a comparative example.

As comparative example 3 a jet mill according to the embodiment shown in FIG. 7 was used. FIG. 7 shows a longitudinal top view of the jet mill in an in-principle presentation. The jet mill comprised a milling chamber 1 with a longitudinal axis 2, an inlet 3 at one end of the axis 2 and an outlet 4 at the opposite end of the axis. In the free flow cross-section inside the milling chamber 1 there were twenty-four pins 5 arranged in sixteen planes of pins, the planes being perpendicular to the longitudinal axis 2. Counting from the inlet 3 to the outlet 4, in the first plane two pins were symmetrically arranged with respect to the longitudinal axis 2. The second plane comprised one pin which was arranged in the center of the milling chamber on the longitudinal axis 2. The pattern of the first and second plane was repeated seven times. Thus, the arrangement of pins in the third, fifth, seventh, ninth, eleventh, thirteenth and fifteenth plane was identical to the arrangement of pins in the first plane, and the arrangement of pins in the second, fourth, sixth, eighth, tenth, twelfth, fourteenth and sixteenth plane was identical to the arrangement of pins in the second plane.

All planes were distant to each other. The distance in the longitudinal direction between the planes was 10 mm. The pins of one plane were laterally offset to the pins of the adjacent planes in that the center of the axis of a pin in one plane and the center of the axis of a pin in a subsequent plane lay on different lines parallel to the longitudinal axis of the mixing chamber. The pins were made of silicon carbide. All pins had the same cylindrical form. Their cross-section was circular with a diameter of 4 mm.

An acceleration chamber 6 with an inlet 7 and an outlet was connected to the milling chamber 1, the outlet of the acceleration chamber 6 being the inlet 3 of the milling chamber 1. The length of the acceleration chamber was 50 mm. The length of the milling chamber was 165 mm. The cross-sectional areas of the milling chamber and the acceleration chamber were rectangular. The width of the milling chamber was 20 mm and its height 5 mm. The width of the inlet of the acceleration chamber was 9 mm.

A screw conveyor was used to feed the feed material into the suction pipe of the injector. In the injector the solid feed material was dispersed in the milling gas jet. The dispersed material was accelerated in the acceleration chamber 6 in a way that the particles reached a velocity similar to the milling gas velocity. Subsequently the particles hit the pins 5 of the first pin segment and were crushed by the mechanical impact. Additionally, particle-particle contacts between particles reflected by the pin and particles dispersed in the milling gas led to high energy impacts and thus particle breakages. The limestone particles were collected at the outlet 4 of the jet mill and their particle size was determined.

Example 2 According to the Invention

Figure 8:
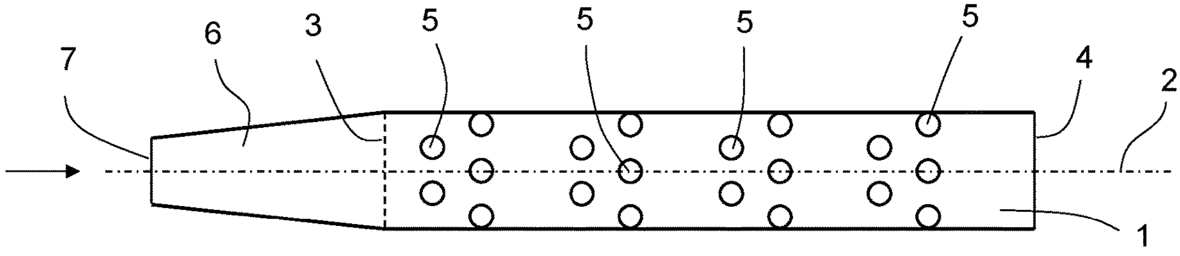
FIG. 8 shows a longitudinal top view of a second embodiment of a jet mill according to the invention.

A jet mill according to the embodiment shown in FIG. 8 was used as a further example according to the invention. FIG. 8 shows a longitudinal top view of the jet mill in an in-principle presentation.

The jet mill comprised a milling chamber 1 with a longitudinal axis 2, an inlet 3 at one end of the axis 2 and an outlet 4 at the opposite end of the axis 2. In the free flow cross-section inside the milling chamber 1 there were twenty pins 5 arranged in four pin segments with five pins each. Each pin segment comprised two planes of pins, the planes being perpendicular to the longitudinal axis 2. Counting from the inlet 3 to the outlet 4, in the first plane two pins 5 were symmetrically arranged with respect to the longitudinal axis. The second plane comprised three pins 5. One pin was arranged in the center of the milling chamber on the longitudinal axis. The two other pins were attached to the left wall and the right wall of the milling chamber respectively. The arrangement of pins in the second, third and fourth pin segment was identical to the arrangement of pins in the first pin segment.

All planes were distant to each other. The distance in the longitudinal direction between the first planes and the respective second planes in each pin segment was 10 mm. The pins of one plane were laterally offset to the pins of the adjacent planes in that the center of the axis of a pin in one plane and the center of the axis of a pin in a subsequent plane lay on different lines parallel to the longitudinal axis of the mixing chamber. The pins were made of silicon carbide. All pins had the same cylindrical form. Their cross-section was circular with a diameter of 4 mm, thus the surface of the pins facing the inlet was convex. The distance in the longitudinal direction between the first planes and the respective second planes in each pin segment in terms of their envelopes was thus 6 mm. Between the pin segments there was one acceleration segment each with no pins. The length of the three acceleration segments was 36 mm each.

An acceleration chamber 6 with an inlet 7 and an outlet was connected to the milling chamber 1, the outlet of the acceleration chamber 6 being the inlet 3 of the milling chamber 1. The length of the acceleration chamber was 50 mm. The length of the milling chamber was 165 mm. The cross-sectional areas of the milling chamber and the acceleration chamber were rectangular. The width of the milling chamber was 20 mm and its height 5 mm. The width of the inlet of the acceleration chamber was 9 mm.

A screw conveyor was used to feed the feed material into the suction pipe of the injector. In the injector the solid feed material was dispersed in the milling gas jet. The dispersed material was accelerated in the acceleration chamber 6 in a way that the particles reached a velocity similar to the milling gas velocity. Subsequently the particles hit the pins 5 of the first pin segment and were crushed by the mechanical impact. Additionally, particle-particle contacts between particles reflected by the pin and particles dispersed in the milling gas led to high energy impacts and thus particle breakages. After the first pin segment the particles were re-accelerated until they hit the first pins 5 of the second pin segment. After the second pin segment the particles were re-accelerated until they hit the first pins 5 of the third pin segment. After the third pin segment the particles were re-accelerated until they hit the first pins 5 of the fourth pin segment. The limestone particles were collected at the outlet 4 of the jet mill and their particle size was determined.

Figure 9:
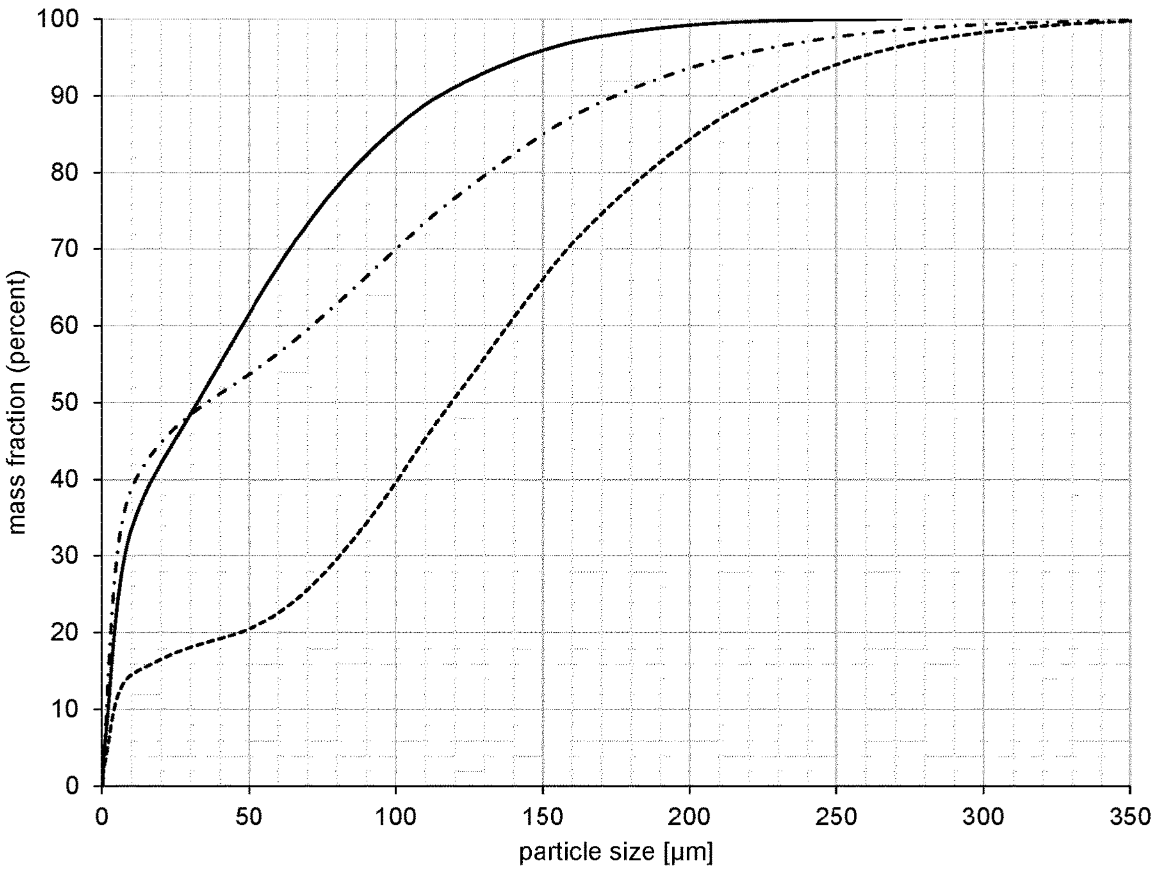
FIG. 9 shows a comparison of particle size distributions obtained by milling particles in jet mills according to FIGS. 7 and 8.

FIG. 9 shows a comparison of the particle size distributions obtained by milling particles in jet mills according to comparative example 3 (FIG. 7) and example 2 according to the invention (FIG. 8). On the abscissa, the particle size is given in micrometers (μm). The ordinate shows the mass fraction in percent. The dotted line represents the feed material which was characterized by about 80% of the particles being larger than 50 μm and about 60% of the particles being larger than 100 μm.

The dash-dotted line shows the particle size distribution of the sample of particles obtained at the outlet of the jet mill of comparative example 3. About 54% of the particles of this sample were smaller than 50 μm and about 30% of the particles were still larger than 100 μm.

The solid line shows the particle size distribution of the sample of particles obtained at the outlet of the jet mill of example 2 according to the invention. About 62% of the particles of this sample were smaller than 50 μm and about 14% of the particles were larger than 100 μm.

The milling process in a jet mill with intermediate acceleration segments according to the invention yields smaller particles with a more homogeneous particle size distribution, which can also be deducted from the graph in FIG. 9 where the slope of the solid line in the range of from 20 to 100 μm is much steeper than the slope of the dash-dotted line in the same range.

Further experiments with a triboluminescent material showed that the breakage of particles in a mill according to FIG. 7 mainly occurred at the first two planes of the mill. In a mill according to the invention as presented in FIG. 8, a constantly intense glowing could be observed over all pins of the mill clearly indicating the more intense milling process due to the acceleration segments.

The invention claimed is:

1. A jet mill comprising a milling chamber with a longitudinal axis, an inlet at one end of the axis and an outlet at the opposite end of the axis, the milling chamber comprising a multitude of pins arranged in the free flow cross-section of the milling chamber, wherein the pins are arranged in at least two planes perpendicular to the longitudinal axis, the planes being distant to each other in the longitudinal direction, and the pins of one plane being laterally offset to the pins of the subsequent plane, wherein the milling chamber is divided into alternate pin segments and acceleration segments, the pin segments each having at least two planes of pins, and the acceleration segments having no pins, wherein the length of the acceleration segments is larger than the longitudinal distance between neighboring planes in the pin segments.

2. The jet mill according to claim 1, wherein the surface of the pins facing the inlet is convex.

3. The jet mill according to claim 1, wherein the pins are removably attached inside the milling chamber.

4. The jet mill according to claim 1, wherein at least some of the pins comprise a sensor capable of detecting a measure for abrasion of the respective pin.

5. The jet mill according to claim 1, wherein the pin segments each have two to five planes of pins.

6. The jet mill according to claim 1, wherein an acceleration chamber with an inlet and an outlet is connected to the milling chamber, the outlet of the acceleration chamber being the inlet of the milling chamber.

7. The jet mill according to claim 6, wherein the inlet of the acceleration chamber has a smaller cross-sectional area than its outlet.

8. The jet mill according to claim 1, wherein the height of the milling chamber is from 3 mm to 10 mm.

9. The jet mill according to claim 1, wherein the pins are made from a material selected from the group of wear resistant steel or wear resistant ceramics.

10. The jet mill according to claim 1, wherein the outlet of the milling chamber is coupled to the inlet of a classifier capable of separating fine particles from coarse particles.

11. The jet mill according to claim 10, wherein the outlet for the coarse fraction is recycled to the inlet of the milling chamber or to the inlet of the acceleration chamber.

12. A process for milling solid particles comprising the steps of (a) injecting the particles in a jet, and (b) feeding the jet including the injected particles into a jet mill according to claim 1.

13. The process according to claim 12, wherein the outlet of the milling chamber is coupled to the inlet of a classifier capable of separating fine particles from coarse particles, and separating at least one fine particle fraction from the classifier feed material.

* * * * *